Sept. 23, 1969　　　　B. NYSTEN　　　　3,467,997
SAFETY PIN

Filed June 26, 1968　　　　　　　　　　2 Sheets-Sheet 1

INVENTOR
BERNHARD NYSTEN
BY
ATTORNEY.

Sept. 23, 1969

B. NYSTEN 3,467,997

SAFETY PIN

Filed June 26, 1968

INVENTOR
BERNHARD NYSTEN
BY
ATTORNEY.

United States Patent Office 3,467,997
Patented Sept. 23, 1969

3,467,997
SAFETY PIN
Bernhard Nysten, Aachen, Germany, assignor to William Prym-Werke, KG, Rhineland, Germany, a corporation of Germany
Continuation-in-part of application Ser. No. 637,209, May 9, 1967. This application June 26, 1968, Ser. No. 740,211
Claims priority, application Germany, May 13, 1966, P 39,440
Int. Cl. A44b 9/18
U.S. Cl. 24—157                                10 Claims

ABSTRACT OF THE DISCLOSURE

A safety pin which comprises a first limb in the form of a needle and a second limb on which there is rigidly mounted a guard of injection molded material containing a generally U-shaped channel bounded by side walls for releasably receiving the first limb when introduced through a lateral insert opening in the guard. A pivot is disposed on the second limb immediately adjacent the guard, and a locking lever of injection molded material is arranged for blocking withdrawal of the first limb from the channel when the locking lever is in a locking position with respect to the guard. The locking lever comprises a hinged portion frictionally mounted for swinging movement about the pivot portion of the second limb against the friction and including a blocking portion. The blocking portion has means thereon, which snappingly engage an edge of an associated side wall of the guard to frictionally retain the locking lever in its locked position.

---

This is a continuation-in-part-application of the copending patent application Ser. No. 637,209, filed May 9, 1967, by Bernhard Nysten and now abandoned.

The present invention relates to a safety pin having two limbs on one of which there is mounted a guard having a channel with a lateral insert opening for receiving the other limb which is in the form of a needle, and a locking lever that is provided adjacent the guard and is adapted to be turned about the mounting limb to an operative or locking position where the free end of the locking lever prevents removal of the needle from the channel.

Known safety pins of this kind comprise a resilient tongue which is located within the guard and the free end of which resiliently bears, either under its own inherent resiliency or under spring loading, against the inside of the side wall of the channel which is adjacent the lateral insert opening. In order to withdraw the pointed end of the needle limb from the channel during opening of the safety pin, a finger is used to depress the tongue within the guard against the resiliency thereof or the resiliency of the spring acting thereon until the needle has been withdrawn from the guard through the insert opening which extends laterally from the channel.

Apart from the cumbersome operation of exerting a force on the tongue during the entire step of withdrawing the needle, it is disadvantageous that the lateral opening for withdrawing the needle from the guard remains closed while the force is being exerted by the finger. Thus, on the one hand the tongue must be depressed to within the interior of the guard by means of finger pressure until the end of the needle has been withdrawn from the guard, but on the other hand such withdrawal of the needle end from the guard is prevented or considerably hindered by the finger which depresses the tongue and which is therefore in an obstructing position. The counteracting and mutually hindering steps during opening of such safety pins have prevented the latter from becoming popular.

Other safety pins are known in which the locking lever is not only turned about a portion of the mounting limb beneath the guard during opening and closing of the safety pin, but it must also be displaced along the mounting limb until a knob on a lever snaps into or becomes released from an aperture in the guard. Thus, in order to open the safety pin, the locking lever must be turned as well as displaced lengthwise of the mounting limb. The manufacture of such parts is costly and the required manipulation during opening and closing of the safety pin is inconvenient. There is also the disadvantage that in use of such a safety pin displacement of the locking lever along the mounting limb is made very difficult by the material that is impaled on the needle because, as the locking lever is displaced away from the guard, the material on the needle must be puckered and this is not always possible. In any case, the upper portion of the safety pin is not properly utilized.

It is one object of the present invention to provide a safety pin which aims to avoid the above-mentioned disadvantages by providing a safety pin which can be rapidly and cheaply manufactured and readily operated in use.

It is another object of the present invention to provide a safety pin which comprises a first limb in the form of a needle, a second limb on which there is mounted a guard of injection molded material containing a channel bounded by side walls for releasably receiving the first limb when introduced through a lateral insert opening in the guard, the pivot portion of the second limb, and a locking lever of injection molded material blocking withdrawal of the first limb from the channel when the locking lever is in a locking position with respect to the guard, the locking lever comprising a hinged portion mounted for swinging movement about the pivot portion of the second limb and a blocking portion at its free end. Preferably, the pivot portion on the second or mounting limb of the safety pin is defined between the guard in which the second limb is anchored and a shoulder that is provided on the second limb at a distance from the guard corresponding to the breadth of the locking lever.

If the guard and the locking lever are simultaneously molded, which is readily possible, these two parts are not only made in a single operation, but there is the additional advantage of being able to connect these parts to the mounting limb of the safety pin during one and the same operation. In fact, the injection molding process can then be carried out in the following simple manner.

As usual, the mold to be used comprises an upper and a lower molding plate having a plurality of molding cavities for a whole series of safety pins according to the present invention. One pair of molding cavities is provided for each safety pin. One of the cavities corresponds to the desired shape of the guard and the other to the shape of the locking lever. These two cavities are spaced from one another at a distance corresponding to the spacing of the guard and locking lever in the finished safety pin and they communicate by means of side passages with the main supply conduit for the molding material. In alignment with the mold cavities for the guard and the locking lever, the mold comprises a further receptacle for inserting the mounting limb of the safety pin. In order to facilitate formation of the cavities and molding of the guard and locking lever without causing an obstruction to each other, the cavity for the locking lever is arranged in the mold at a displacement of 180° to the cavity for the guard as referred to the locking position of the locking lever in the finished safety pin.

During manufacture, the bare mounting limbs of the individual safety pins are first of all inserted in the respective receptacles of the mold, whereupon the two molding plates are closed. The molding material, preferably a plastics material, is then injected through the main supply conduit and through the side passages into the individual mold cavities. This completes manufacture of the guard and locking lever and simultaneous attachment of these parts to the mounting limb of the safety pin.

The guard is fixed to the mounting limb against rotation or sliding if the extreme end of the mounting limb was suitably bent or roughened but the locking lever is rotatable on the smooth mounting limb. Since the locking lever was molded to the mounting limb, it embraces its periphery so closely that the friction between the locking lever and the surface of the mounting limb is quite pronounced during rotation of the locking lever and must be overcome while the lever is so rotated. This has the advantage that the locking lever will not unintentionally swing out of its locking position.

In its locking position, the blocking portion of the locking lever comes to lie in the lateral insert opening leading to the channel, so that the insert opening is correspondingly constricted and prevents the needle from being withdrawn. Preferably, part of the channel itself will thereby also be blocked. However, it is not essential that the entire insert opening be obstructed by the blocking portion of the locking lever in the locking position of the latter.

The shoulder in the mounting limb, which may be in the form of an enlargement, prevents displacement of the locking lever along the mounting limb. This enhances the operability of the lever and avoids the need for puckering the material on the needle during actuation of the locking lever. The entire length of the safety pin up to its head is therefore available for engaging the material.

It is of particular advantage if a recess is provided in the guard in the vicinity of the pivot portion of the mounting limb, the locking lever being adapted to fit into this recess. In the locking position of the lever, at which opening of the safety pin is prevented, the locking lever will be swung into the recess in the guard, i.e. the locking lever will be sunk into the guard whereby the external configuration of the guard can be smooth and uninterrupted by projections. Since the locking lever is not spring loaded either in its locking or its inoperative positions, introduction and withdrawal of the needle is extremely simple.

It is recommended that the locking lever does not exceed the dimensions of the recess in the guard and in particular that the shape of the locking lever conforms to the shape of the recess. In its locking position, the lever will completely fill out the recess. In this way, the guard and the locking lever will form a closed smooth body in the locking position of the lever, without any obstructing projections. The smooth shape and efficient closing of such a safety pin will make it particularly applicable for the garments of small children, for example for bandages and diapers.

For additional security in the closing position of the locking lever, it is preferred to provide a snap action or catch and latch device of which one component is provided on or by the free end of the locking lever and the other component is formed on the guard. If the locking lever is now in its locking position, it is even less likely to be swung unintentionally to its inoperative position. Instead, a certain amount of force must first be applied in order to disengage the catch and latch.

A particularly simple and effective catch and latch device is obtained if the channel itself, and/or at least one of its side walls, is used as one of the components and the other component is constituted by one or more ribs provided at the free end of the lever and parallel thereto. It will be evident that this avoids the need for providing an additional an separate snap action device on the guard. The production of such a catch and latch device is also particularly simple in an injection molding operation.

The locking lever may be provided with a suitable abutment which cooperates with the guard in the locking position of the lever. Such an abutment will ensure that the locking position of the lever is accurately predetermined. Since swinging of the lever between its operative and inoperative positions can in this case be carried out only in a respective single direction as determined by the abutment in relation to the guard, unintentional displacement of the lever out of its locking position is made even more difficult.

One simple form for such an abutment is a lateral tongue projection on the lever co-operating with an elongation of one of the channel side walls into the aforementioned recess. However, it is also possible to provide the end of the locking lever with a flange which, in the locking position of the lever, abuts one side wall of the channel.

In the locking position of the lever, it is sufficient if the latter obstructs only part of the lateral insert opening leading to the channel. This is because in the locking position the lever will prevent unintentional opening of the safety pin even if it covers only part of the insert opening. As long as the locking lever obstructs the path of the needle, withdrawal of the needle is obviously not possible.

With these and other objects in view, which will become apparent in the following detailed description, the present invention will be clearly understood in connection with the accompanying drawings, in which:

FIGURES 1 to 9 are enlarged fragmentary side elevations of nine different embodiments, the part of the safety pin remote from the guard being omitted in each case;

FIGS. 10 and 11 are cross-sections along the lines 10—10 and 11—11 in FIGS. 1 and 5, respectively;

Figure 1:
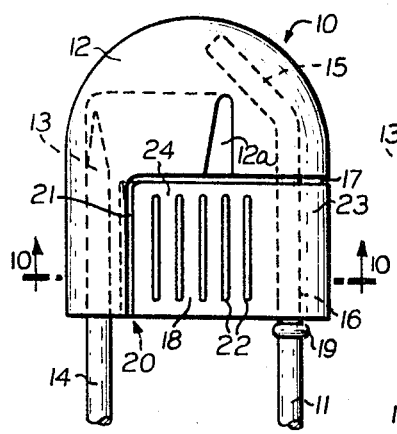

Referring now to the drawings, and in particular to FIG. 1, there is shown the guard end of a safety pin 10; the remaining portion of the safety pin can be of any suitable or conventional construction and has been omitted for the sake of simplicity. The safety pin comprises a first limb or needle 14 and a second or mounting limb 11 which, at the anchored end 15 thereof, has secured to it a guard 12 containing a channel 13 for receiving the needle 14.

Adjoining the end 15 of the limb 11 anchored in the guard 12, the latter is provided with a recess 17 which exposes a pivot portion 16 of the limb 11 and in the illustrated case also exposes the entire length of the channel 13. Within the recess 17 there is provided a locking lever 18 which can be swung about the pivot portion 16 of the limb 11. The hinged portion 23 of the locking lever 18 surrounds the pivot portion 16 and its upper edge lies against or adjacent the guard 12 while its lower edge bears on a shoulder 19 in the form of an enlargement on the limb 11 which prevents displacement on the locking lever 18 along the limb 11 as it is rotated. The first limb or needle 14 projects into the recess 13 of the guard 12 and the latter is equipped with a slot 12a disposed on one side of the guard 12.

Figure 6:
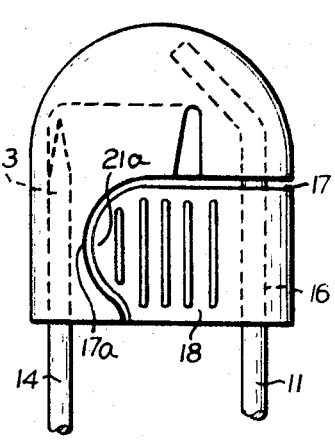
Figure 7:
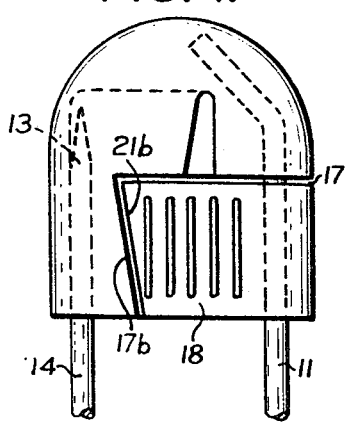
Figure 8:
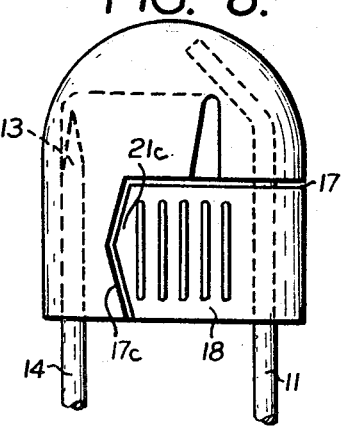
Figure 9:
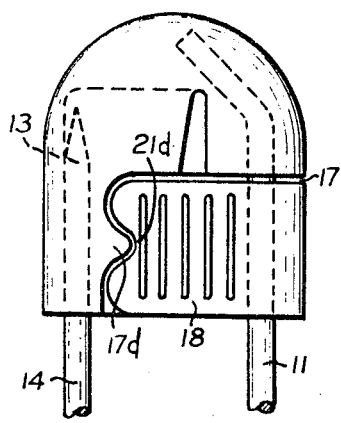

In the illustrated case, the free end of the locking lever 18 is in the form of a blocking portion 24 which serves to close the lateral insert opening leading to the channel 13, the lateral insert opening in the present case coinciding with the recess 17 in the guard. The end of the locking lever 18 and a part of the guard 12 that cooperates therewith in the locking position of the lever are each provided with one component of a snap action or catch and latch device 20 (also see FIG. 6). In the illustrated case the component on the guard 12 is constituted by the channel 13 itself which serves as a detent. The component at the free end of the locking lever 18 is formed by a rib 21 which extends parallel to the channel 13.

In FIG. 1 the safety pin is shown in its closed condition with the locking lever 18 in its locking or operative position. The end of the limb or needle 14 is located in, and projects through, the channel 13 of the guard 12. The locking lever 18 is latched to the side walls of the channel 13 by means of the rib 21. In order to swing the locking lever 18 to its inoperative position, a force must be exerted on the locking lever 18 which not only overcomes the friction between the hinged portion 23 and the pivot portion 16, but which also resiliently deforms the interengaging components, namely the portion of the guard 12 and the rib 21 of the catch and latch device.

The locking lever 18 can be moved from its operative to its inoperative position by swinging it in either direction, i.e. into or out of the plane of the drawing, until the locking lever 18 no longer forms an obstruction and the needle 14 can be lifted out of the channel 13 and through the slot 12a. In the present case, the edge of the lateral insert opening which leads to the channel 13 and which is completely closed in the locking position of the locking lever 18 extends close to the base of the channel 13 or, in other words, the side walls bounding the channel 13 are shallow throughout their entire length. Thus, when the locking lever 18 is in its inoperative position, the displacement required to move the needle 14 laterally out of the channel 13 is quite short.

To facilitate manipulation of the locking lever 18, its surface may be striated as shown at 22 in FIG. 1.

Figure 2:
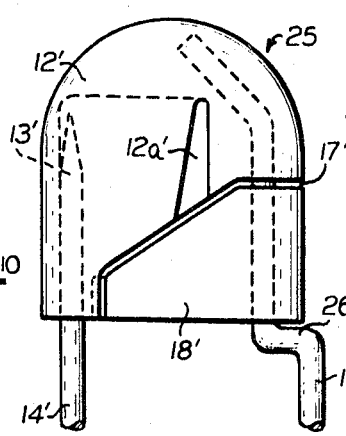

The safety pin 25 of FIG. 2 differs somewhat from the safety pin 10 of FIG. 1, although many parts are quite similar. For the purpose of clarity, those parts of the safety pin 25 which are similar in construction to corresponding parts in FIG. 1 are designated with the same reference numerals but differentiated by an index stroke.

In the safety pin 25, the shape of the recess 17′ in the guard 12′ is different and so is that of the locking lever 18′ which completely fills out the recess 17′. While the part of the recess 17′ in the vicinity of the lower section of the channel 13′ closely approaches the base of the channel, it tapers away from the base at the upper section of the channel 13′. The side walls of the channel 13′ are, therefore, not of constant height, but are shallow at one end and increase in height in the direction towards the point of the needle 14′. This means that during opening of the safety pin the needle 14′ must be lifted comparatively far from the base of the channel 13′ before it can be withdrawn laterally from the guard in order to pass through the slot 12a. However, such shaping will also make unintentional withdrawal of the limb 14′ more difficult.

Adjoining the side of the locking lever 18′, remote from the guard 12′, the mounting limb 11′ is provided with a special shoulder which prevents undesirable displacement of the lever 18′ along the limb 11′. The shoulder is in this case in the form of a crank 26 in the limb 11′. However, a slight bend in the limb would also suffice.

In the safety pin 28, according to FIG. 3, like parts are again provided with the same reference numerals as in the preceding examples but they are differentiated by double index strokes.

One difference from the preceding examples resides in that the recess 17″ only exposes the lower section of the channel 13″. The recess 17″ is completely filled out by a correspondingly shaped and dimensioned locking lever 18″. Further, the recess 17″ does not extend right through the guard 12″; instead, one side wall 29″ of the channel 13″ (which side wall is for the most part covered by the locking lever 18″ in the illustration of FIG. 3), extends into the recess 17″. At its side facing the guard 12″, the locking lever 18″ is provided with a projecting tongue 30. In the operative position of the locking lever 18″, this tongue comes to lie against the extended side wall 29″ of the channel 13″ and adjacent the slot 12a″.

Figure 3:
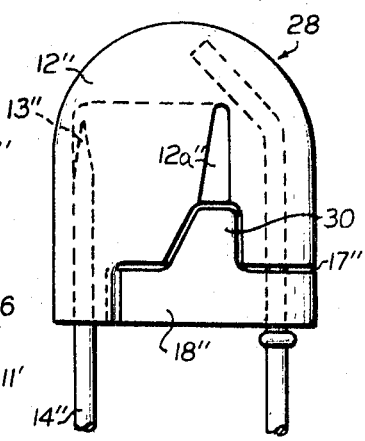

To move the locking lever 18″ out of its operative position of FIG. 3 to an inoperative position, its tongue 30 must be moved away from the side wall 29″ which serves as a stop or abutment. This determines the direction of rotation of the locking lever 18″, i.e. the lever must be swung out of the plane of the drawing before the needle 14″ can be withdrawn by lifting it into the slots 31 and 12a″ that are located over the side wall 29″. The slots 31 and 12a″ therefore, serve as lateral insert openings for the needle 14″ leading to the channel 13″.

Figure 4:
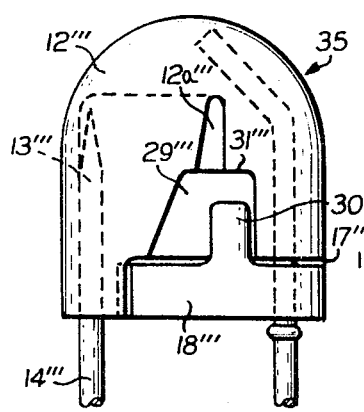

FIG. 4 illustrates a safety pin 35 which is similar to the preceding examples and where like parts are designated by like reference numerals but differentiated by triple index strokes.

One difference from the preceding examples resides in that the insert openings in the form of slots 31‴ and 12a‴ in the guard 12‴ extend further towards the base of the channel 13‴. The locking lever 18‴ does not, however, have a tongue 30‴ of the same size; for the purpose of abutment with the side wall 29‴ of the channel 13‴, it is sufficient if the tongue 30‴ is narrow, as illustrated.

It will be evident that the locking lever 18‴ does not completely fill out the lateral insert opening 31‴ leading to the channel 13‴. However, in its locking position the locking lever 18‴ nevertheless obstructs the path of movement of the needle limb 14‴, so that in this case the latter can still not be unintentionally lifted out of the guard. Since the lateral insert opening 31‴ extends closer to the base of the channel 13‴ than is the case for the safety pin 28 of FIG. 3, a small amount of displacement is required for the needle 14‴ for the purpose of opening the safety pin.

Figure 5:
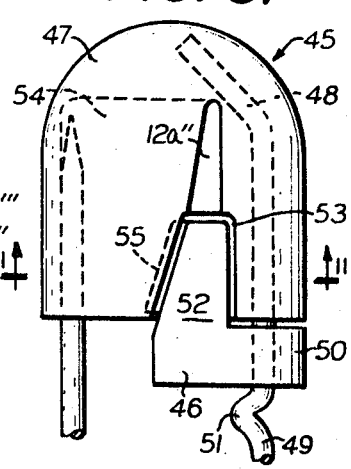

In the safety pin 45 of FIG. 5, the locking lever 46 is not arranged entirely within the recess 53 of the guard 47, but is for the most part located beyond the recess 53. The locking lever 46 is pivotable about the pivot portion 50 of the limb 49, which portion adjoins the end 48 anchored in the guard 47. At a spacing from the guard 47, corresponding to the breadth of the locking lever 46, there is a shoulder 51 in the form of a fold-like squeeze portion in the mounting limb 49.

While the horizontal portion of the lever 46 in FIG. 5 has one end pivoted to the pivotal portion 50 of the mounting limb 49, the part of the locking lever 46 that is perpendicular thereto forms the blocking portion 52 which obstructs the entire lateral insert opening 53. When viewed in the locking position of the locking lever, as shown in FIG. 5, the side of the blocking portion 52 facing the channel 54 is provided with a longitudinal rib 55 (also see FIG. 11) which is one component of a catch and latch device. The other component is formed by the front side wall 56 of the channel 54.

Figure 11:
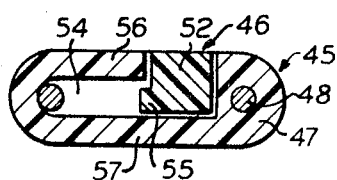

The blocking portion 52 of the locking lever 46 also serves to abut the rear side wall 57 of the channel 54 when the locking lever 46 is in its locking position as shown in FIG. 11.

Referring now again to the drawings, and in particular to FIGS. 6 to 9, it will be found that these embodiments are substantially identical with that disclosed in FIG. 1, with the exception of the end formation of the locking lever. Accordingly, the same numerals as shown in FIG. 1 have been applied to identical parts, and the locking lever 18 has, in FIG. 6, a round end portion 21a, in FIG. 7 an angular end portion 21b, in FIG. 8 a pointed end portion 21c, and in FIG. 9 a backward round portion 21d. The recess 17a, 17b, 17c and 17d, in the guard 12 is complementary to the design of the locking lever.

Due to the fact that the locking lever 18 is wider at any point above its lower end, in that the locking lever cannot slide down and unlock the safety pin.

Figure 10:
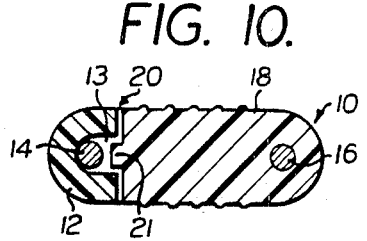
Figure 12:
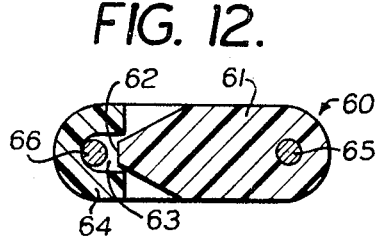
FIGS. 12 to 14 are similar cross-sections through three further different embodiments of the safety pin.
Figure 13:
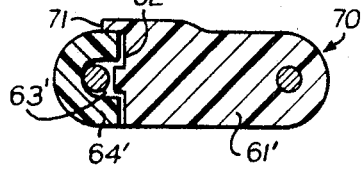
Figure 14:
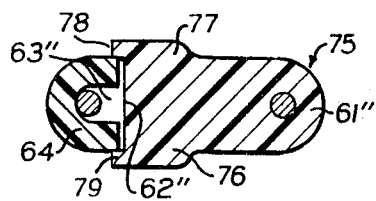

FIGS. 12 to 14 are cross-sections similar to FIGS. 10 and 11, but of different embodiments which particularly show other forms of catch and latch devices and abutments between the locking lever and the guard. In all three embodiments the channel or the side walls thereof constitute one component of the device, while the other component is formed by differently shaped ribs on the locking lever.

In the safety pin 60 of FIG. 12, the locking lever 61 is tapered at its free end 62 to a width correponding somewhat to the mouth of the channel 63 in the guard 64. In the locking position of FIG. 12, the locking lever 61, which is pivotable about the mounting limb 65, does not permit the needle 66 from being lifted out of the channel 63 of the guard 64.

In the FIG. 13 example, the catch and latch device of the safety pin 70 is somewhat similar to that of FIGS. 1 and 10. The difference is that the free end 62' of the locking lever 61' carries a lateral flange 71 which co-operates with one side wall of the channel 63' to serve as a stop.

In the safety pin 75 of FIG. 14, the catch and latch device between the guard 64" and the locking lever 61" differs from the preceding examples. At its free end 62" the lever 61" is provided at both sides with an enlargement 76, 77 which forms a respective rib 78, 79 extending along the channel 63". These ribs 78, 79 co-operate with the two side walls of the channel 63".

Figure 16:
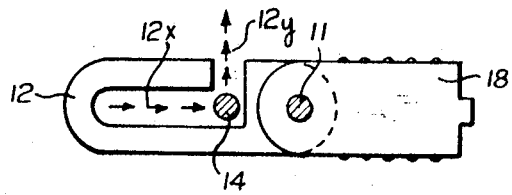
FIGS. 16 and 17 are end views of two embodiments of the cap.
Figure 17:
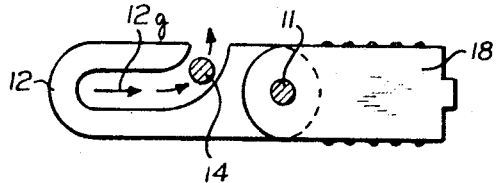
Figure 15:
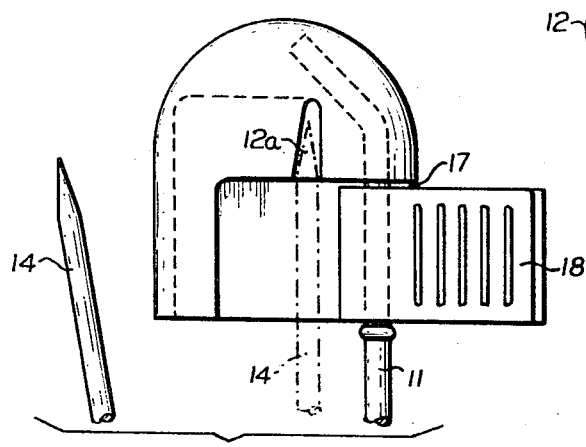
FIG. 15 is a fragmentary side elevation of a safety pin, shown in unlocked position.

Referring now finally to FIGS. 16 and 17, two embodiments are disclosed for the slot at the open end of the guard 12. In FIG. 16 the slot requires a movement across the guard 12 and then laterally out, as indicated by the arrows 12x and 12y. In the embodiment of FIG. 17, one edge is rounded in the slot, permitting a single curved movement along the arrow 12z, and providing a smooth opening of the safety pin.

I claim:
1. A safety pin comprising
a first limb in the form of a needle,
a second limb on which there is rigidly mounted a guard of injection molded material containing a generally U-shaped channel bounded by side walls for releasably receiving said first limb when introduced through a lateral insert opening in said guard,
a pivot portion on said second limb immediately adjacent said guard, and
a locking lever of injection molded material for blocking withdrawal of said first limb from said channel when said locking lever is in a locking position with respect to said guard,
said locking lever comprising a hinged portion frictionally mounted for swinging movement about said pivot portion of said second limb against said friction and including a blocking portion,
said blocking portion having means thereon, which snappingly engage an edge of an associated side wall of said guard to frictionally retain said locking lever in its locked position.
2. The safety pin, as set forth in claim 1, wherein said pivot portion on said second limb is defined between said guard and shoulder on said second limb.
3. The safety pin, as set forth in claim 1, wherein the distance between the free end of said blocking portion and said hinged portion of said locking lever is substantially equal to the spacing of at least one of said channel side walls from said hinged portion.
4. The safety pin, as set forth in claim 1, wherein said second limb is anchored in said guard, and said locking lever fits into a recess provided in said guard in front of where said second limb enters said guard.
5. The safety pin, as set forth in claim 4, wherein the shape of said locking lever conforms to the shape of said recess in said guard.
6. The safety pin, as set forth in claim 1, wherein the thickness of said locking lever and of said guard are substantially equal.
7. The safety pin, as set forth in claim 1, wherein at least one of said channel side walls forms one component of a catch and latch device of which the other component is provided on said blocking portion of said locking lever.
8. The safety pin, as set forth in claim 1, wherein said locking lever obstructs at least part of said insert opening, when said locking lever is in said locking position.
9. The safety pin, as set forth in claim 1, wherein said locking lever is provided with a tongue projection co-operating with an elongation of one of said channel side walls serving as a stop in said locking position of said locking lever.
10. The safety pin, as set forth in claim 1, in which said guard and said locking lever are integral with said second limb.

References Cited

UNITED STATES PATENTS 2,312,885  3/1943  Dies _____ 24—161
2,551,063  5/1951  Sneirson _____ 24—156

FOREIGN PATENTS 1,105,138  6/1955  France.

DONALD A. GRIFFIN, Primary Examiner

UNITED STATES PATENT OFFICE
CERTIFICATE OF CORRECTION

Patent No. 3,467,997       Dated September 23, 1969

Inventor(s) Bernhard Nysten

It is certified that error appears in the above-identified patent and that said Letters Patent are hereby corrected as shown below:

In the heading to the patent specification, line 4, for "Prym-Werke, K.G., Rhineland, Germany, a corporation"

read --Prym-Werke, K.G., Stolberg, Rhineland, Germany a corporation --

SIGNED AND
SEALED
FEB 17 1970

(SEAL)
Attest:

Edward M. Fletcher, Jr.
Attesting Officer

WILLIAM E. SCHUYLER, JR.
Commissioner of Patents